Nov. 24, 1931.  T. W. ROACH  1,833,338
SAW FILING GUIDE
Filed April 10, 1930
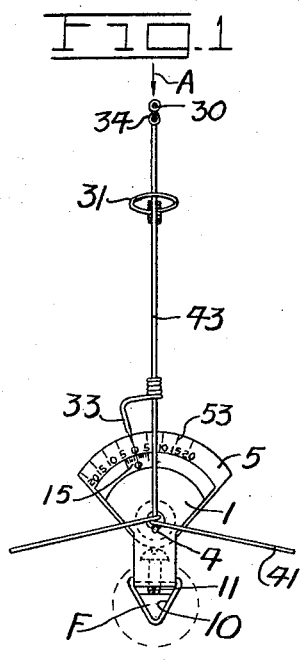
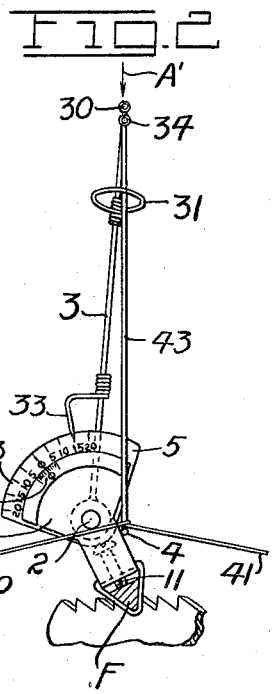
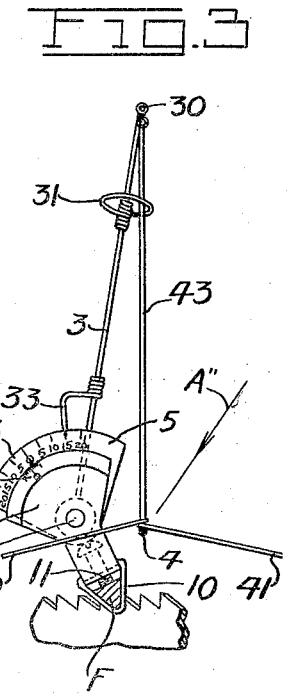
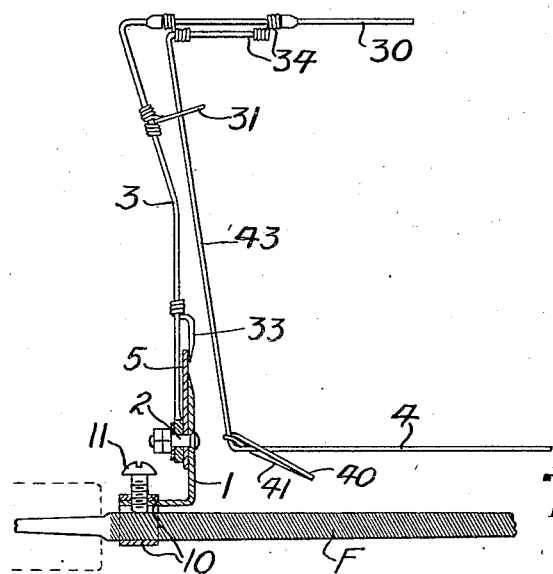
Inventor
Thomas W. Roach
By Charles L. Reynolds
Attorney Patented Nov. 24, 1931

1,833,338

UNITED STATES PATENT OFFICE

THOMAS W. ROACH, OF SEATTLE, WASHINGTON

SAW FILING GUIDE

Application filed April 10, 1930. Serial No. 443,010.

My invention relates to an improvement in saw filing guides, and is more particularly an improvement upon my application Serial No. 327,016, filed December 19, 1928, and upon my application Serial No. 360,470, filed May 4, 1929.

In using the device of each of my former applications, it was necessary for the saw filer to stand immediately above the file, in order that he might kept the aligner bar of the guide properly aligned with the axis of the file with which he was doing the work, or else to judge from experience whether or not the two were in alignment. The necessity of standing immediately over the file and looking directly down upon it placed the filer in an unnatural and cramped position, but if he assumed a natural stance, at one side of the file and aligner bar, it became necessary for him to guess at the alignment of the aligner bar and file, and this to a considerable degree lessened the advantage of the saw filing guide. It is an object of my present invention to provide a means in such a saw filing guide, whereby the same may be set for the proper angle of the file relative to the edge of the saw, and may then be angularly offset from such position, so that as the saw filer assumes a natural position at one side of the file, he may look towards the file, not directly down upon it, but from the side, and the aligner bar will be positioned in such line of sight from the saw filer to the file itself, and the filer will know, when he maintains the aligner bar in this line of sight, that the file is set at the proper angle relative to the edge of the saw.

My invention comprises the novel parts and the novel combination and arrangement thereof, as shown in the accompanying drawings, described in this specification and as more particularly pointed out by the claims which terminate the same.

In the accompanying drawings I have shown my invention in a form which is at present preferred by me.

Figures 1, 2 and 3 are elevations taken in the direction of the length of the file, showing my saw filing guide in three successive positions preparatory to use.

Figure 4 is a side elevation of the guide, parts of the base being shown in section.

As in my former applications, a base 1 is provided with a socket 10, within which is received a file F, upon which the base is thus supported, and the base may be firmly secured upon the file by means of the set screw 11, by means of which the file and socket are kept substantially coaxial. Pivotally mounted upon the base, as for instance, by means of the pin 2, is an upright 3, which terminates at its upper end in a horizontal rod 30, which is parallel to the pivot pin and to the axis of the socket 10, and this rod 30 forms a pivot indicated at 34, for the supporting link 43 of an aligner bar 4, which bar is maintained parallel to the axis of the socket 10. Preferably, this aligner bar is so supported that it may swing through a path which includes the axis of the pivot pin 2.

The upright 3 is provided with an index 33, which cooperates with a scale 53. While this is in effect a part of the base 1, actually I prefer that the scale 53 be not inscribed directly upon the base 1, but upon a separate plate 5, which is pivotedly mounted upon the base 1, usually upon the same pin 2 which carries the upright 3. The upright 3 and plate 5 are mounted upon the pin 2 so that they may be angularly adjusted about the pin, but will then be frictionally held in adjusted position. There may be provided an indicating means, such as the small scale 15 upon the base 1, cooperating with an index mark upon the plate 5, by means of which angular variation of the plate relative to the base may be indicated.

In Figure 1, all parts are shown in their zero position. The scale 15 coincides with the zero mark on the scale 53, carried by the plate 5, and the index finger 33 likewise corresponds with the same zero mark of the scale 53. In this position, the aligner bar 4 is in direct vertical alignment with the axis of the socket 10, and as is indicated by the arrow A, it is necessary to look immediately down upon the aligner bar 4 to bring it in line of sight with the axis of the socket 10 and of the file F. The two angular sides of the file are equal with respect to a horizontal line.

In Figure 2, the upright 3 has been moved angularly with respect to the plate 5 and its index finger 33 is angularly adjusted relative to the zero point of the scale 53. The angles of the sides of the file F have been changed with respect to the horizontal and with respect to the edge of the saw, but nevertheless, in order to bring the aligner bar 4 in the line of sight to the axis of the file F, it is necessary to look directly down, as is indicated by the arrow A′.

In Figure 3 is shown the final adjustment. The adjustment corresponding to the position of Figure 2 having previously been made, or the index 33 having been angularly adjusted by an amount which experience has shown to be desirable, the filer now assumes a natural stance at one side of the file F, and instead of further adjusting the index 33, it is left at what is known to be the proper angle, and the plate 5 is adjusted angularly with respect to the base 1 and with respect to the zero point of the small scale 15. This action causes the aligner bar 4 to swing to one side of the axis of the file F and the socket 10, yet nevertheless it remains in parallelism therewith, and without changing the angle of the sides of the file relative to the edge of the saw. This position is shown in Figure 3, and it will be apparent that the line of vision of the saw filer, indicated by the arrow A″, will now include the aligner bar 4 as it passes to the axis of the file F. The filler maintains his natural position and may always be sure that the file is at the proper angle relative to the edge and teeth of the saw so long as the aligner bar is in alignment with the axis of the file.

As in my former applications, I prefer that a guard ring 31 be provided, encircling the link 43 to restrain the same from too great freedom of movement, and I prefer that there be employed, in association with the aligner bar 4, the fingers 40 and 41, one or the other of which may be kept in alignment with the plane of the saw, thereby to maintain the file at the proper angle transversely of the plane of the saw.

What I claim as my invention is:

1. In a saw filing guide, in combination, a base having means adapting it to be supported upon a file, a plate pivotally secured upon said base and adjustable angularly relative thereto, an upright pivotally mounted upon said base, said upright and plate having a cooperating angular scale and index, and an aligner bar pivotally supported and depending from said upright, in position to be aligned with the file upon which the base is supported.

2. The combination of claim 1, the pivotal support of the upright being coaxially with that of the plate, and the aligner bar being adapted to swing on its pivotal supports through a path which includes such axis.

3. In a saw-filing guide, in combination, a base having a socket adapted to receive a file, thereby to support the base, an aligner bar and means supporting the same from said base including a pivotal support enabling the aligner bar to swing through positions always parallel to the axis of said socket, said supporting means including a normal angular adjustment and indicating means, and an additional angular offset adjusting means.

4. In a saw-filing guide, in combination, a base having a socket adapted to receive a file, thereby to support the base, an aligner bar and means supporting the same from said base including a pivotal support enabling the aligner bar to swing through positions always parallel to the axis of said socket, said supporting means including angular adjusting means and indicating means to set the socket and file held therein at a selected angle relative the saw edge, and also including angular adjusting means for offsetting the aligner bar laterally from such position by a selected amount to bring it in line of sight from the user to the file.

Signed at Seattle, King County, Washington, this 3rd day of April, 1930.

THOMAS W. ROACH.